United States Patent [19]
Watanabe

[11] Patent Number: 5,938,530
[45] Date of Patent: Aug. 17, 1999

[54] IMAGE PROCESSING DEVICE AND IMAGE PROCESSING METHOD

[75] Inventor: Kunio Watanabe, Tokyo, Japan

[73] Assignee: Kabushiki Kaisha Sega Enterprises, Tokyo, Japan

[21] Appl. No.: 08/760,804

[22] Filed: Dec. 5, 1996

[30] Foreign Application Priority Data

Dec. 7, 1995 [JP] Japan .................................. 7-345203

[51] Int. Cl.$^6$ ........................................................ A63F 9/24
[52] U.S. Cl. ........................... 463/31; 463/2; 463/32
[58] Field of Search .................................. 463/1, 30–33; 434/307 R; 345/112–117, 126–131, 147–153, 418–420, 423, 426–439, 468, 473–475; 273/380

[56] References Cited

U.S. PATENT DOCUMENTS 5,261,041 11/1993 Susman .................................. 345/473
5,415,549 5/1995 Logg .................................... 434/307 R
5,572,235 11/1996 Mical et al. ............................ 345/153
5,596,693 1/1997 Needle et al. .......................... 345/474

*Primary Examiner*—Jessica J. Harrison
*Assistant Examiner*—Mark A. Sager
*Attorney, Agent, or Firm*—Finnegan, Henderson, Farabow, Garrett & Dunner, L.L.P.

[57] ABSTRACT

An object is to provide an image processing device that is capable of reproducing effectively objects or characters in a condition showing considerable variation, such as explosions or smoke.

This image processing device is constituted of an output device and processing devices constituted of ROM that stores data constituting an object whose mode is anticipated to show a series of changes in prescribed time, the object being constituted of a plurality of portions, and that execute image processing whereby animation is effected in respect of each portion, the processing results from these processing devices being displayed on an output device.

21 Claims, 16 Drawing Sheets

FIG.4A  FIG.4B
FIG.4C
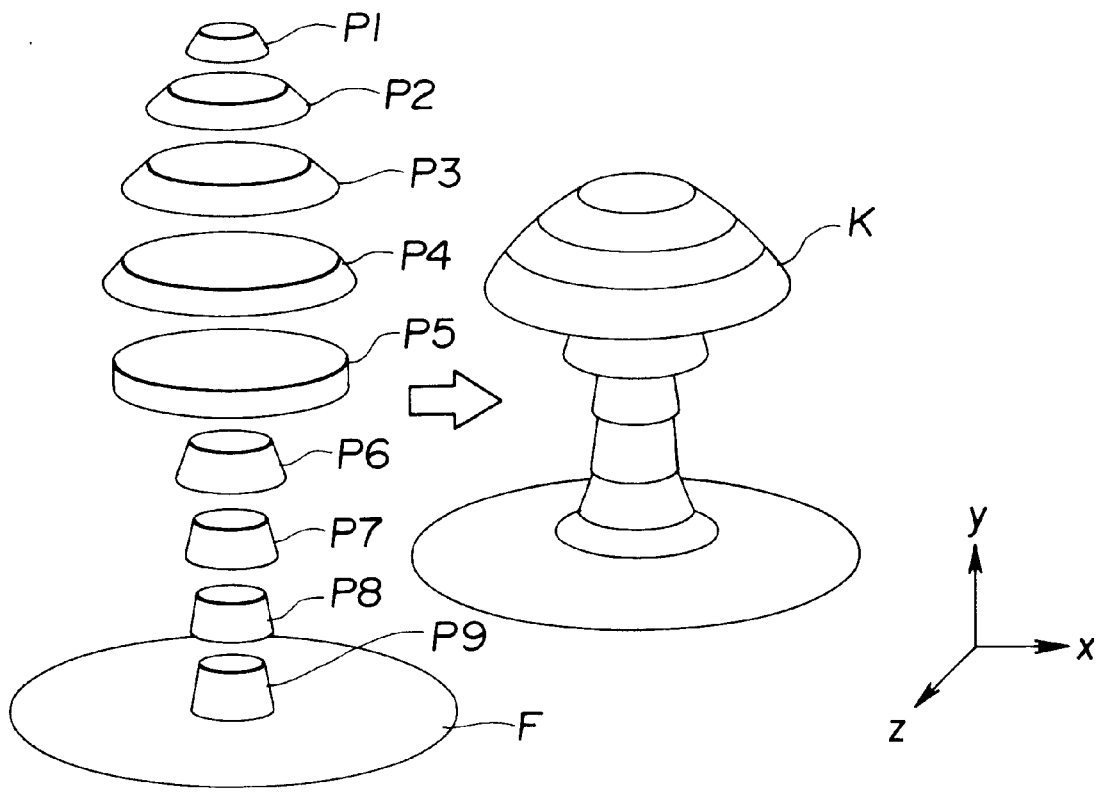
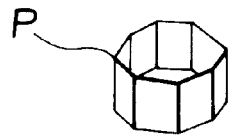

FIG.6A
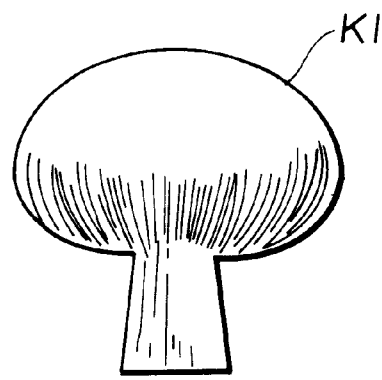
FIG.6B
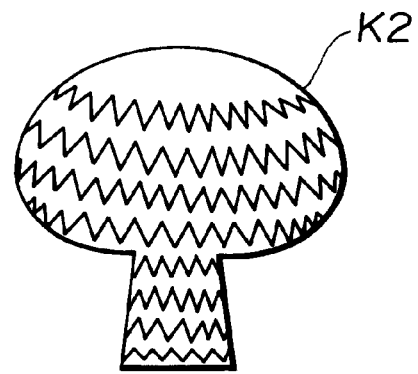
FIG.7A  FIG.7B  FIG.7C
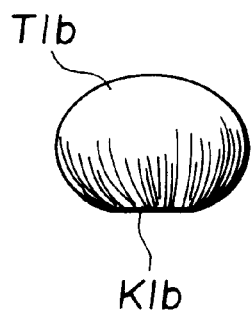 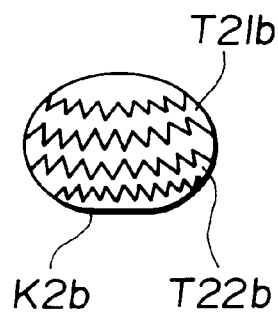 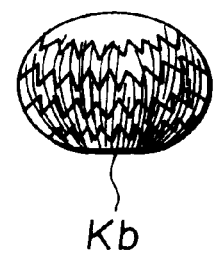

FRONT FACE

IMAGE PROCESSING DEVICE AND IMAGE PROCESSING METHOD

BACKGROUND OF THE INVENTION

1. Field of the Invention

The present invention relates to an image processing device suitable for application principally to video game devices, and more particularly to an image processing device whereby pictures such as explosions or smoke, whose form changes continuously, can be effectively represented.

2. Description of the Related Art

In conventional video game machines, there are a large number of "shooting games". In such shooting games, a peripheral device such as a gun unit is connected to the casing of the main unit of the game machine and the machine performs an evaluation as to whether a projectile displayed on the CRT has hit the target and displays an image of an explosion at the point where the projectile lands.

Typically the form of such an explosion may be anticipated to show a series of very considerable changes within a prescribed time. In existing video game machines there are therefore various conventional examples for effectively representing an explosion and for making this possible with a small amount of data.

A prior art technique of showing a player a powerful explosion three-dimensionally is known, in which, in order to reduce the amount of data, textures are mapped on to planar polygons and these are directed towards the viewpoint (camera). However, in this prior art example, it is very difficult to display an explosion three-dimensionally.

The prior art techniques are subject to the following problems. In the case of the prior art technique in which textures are mapped on to flat polygons, as described above, this results in the image of the explosion seen from the front always being presented even if the viewpoint is changed.

SUMMARY OF THE INVENTION

Accordingly, it is an object of the present invention to provide an image processing device that is capable of effectively reproducing objects or characters such as explosions or smoke in a condition in which the shape or mode of the explosion or smoke etc. changes in a way that is not easy to anticipate, in other words, in a condition which is highly liable to change. A further object is to implement this with a smaller amount of data.

In order to achieve these objects, the present invention comprises: display means; memory means that stores data constituting objects whose form is anticipated to show a series of changes within a prescribed time; processing means that builds up said object from a plurality of portions and that executes image processing implementing animation in respect of each portion; and an output means that outputs to said display means the results of the processing of this processing means. Consequently, with the present invention, since the desired animation can be implemented for each portion individually, shape changes of the object can be implemented for each portion individually and an image approximating more realistically to an explosion image etc. can thereby be represented.

Also, in another aspect, the present invention comprises: display means; memory means that stores data whereby an object is built up whose form may be expected to exhibit a series of changes in a prescribed time, and texture data to be applied to this object; processing means that executes image processing whereby a plurality of textures are simultaneously applied to said object, and whereby animation is executed in respect of at least one texture; and output means that outputs to said display means the processing result of this processing means. As a result, more varied image representation can be achieved with a small amount of data, since new textures can be implemented by combining a plurality of textures.

The aforesaid objects may be in particular explosions in a game program. Also, the animation corresponds to at least one type of image processing of movement, rotation, magnification, compression, and modification.

BRIEF DESCRIPTION OF THE DRAWINGS

FIGS. 4A–4C are diagrams of object data of a mushroom cloud generated by this device;

FIGS. 6A and 6B are diagrams of two unit image data items of a mushroom cloud generated by this device;

FIGS. 7A–7C are diagrams of data of an expanding portion of the mushroom cloud generated by this device;

DESCRIPTION OF THE PREFERRED EMBODIMENTS

A mode of implementing the present invention is described below with reference to the drawings.

Construction

Figure 1:
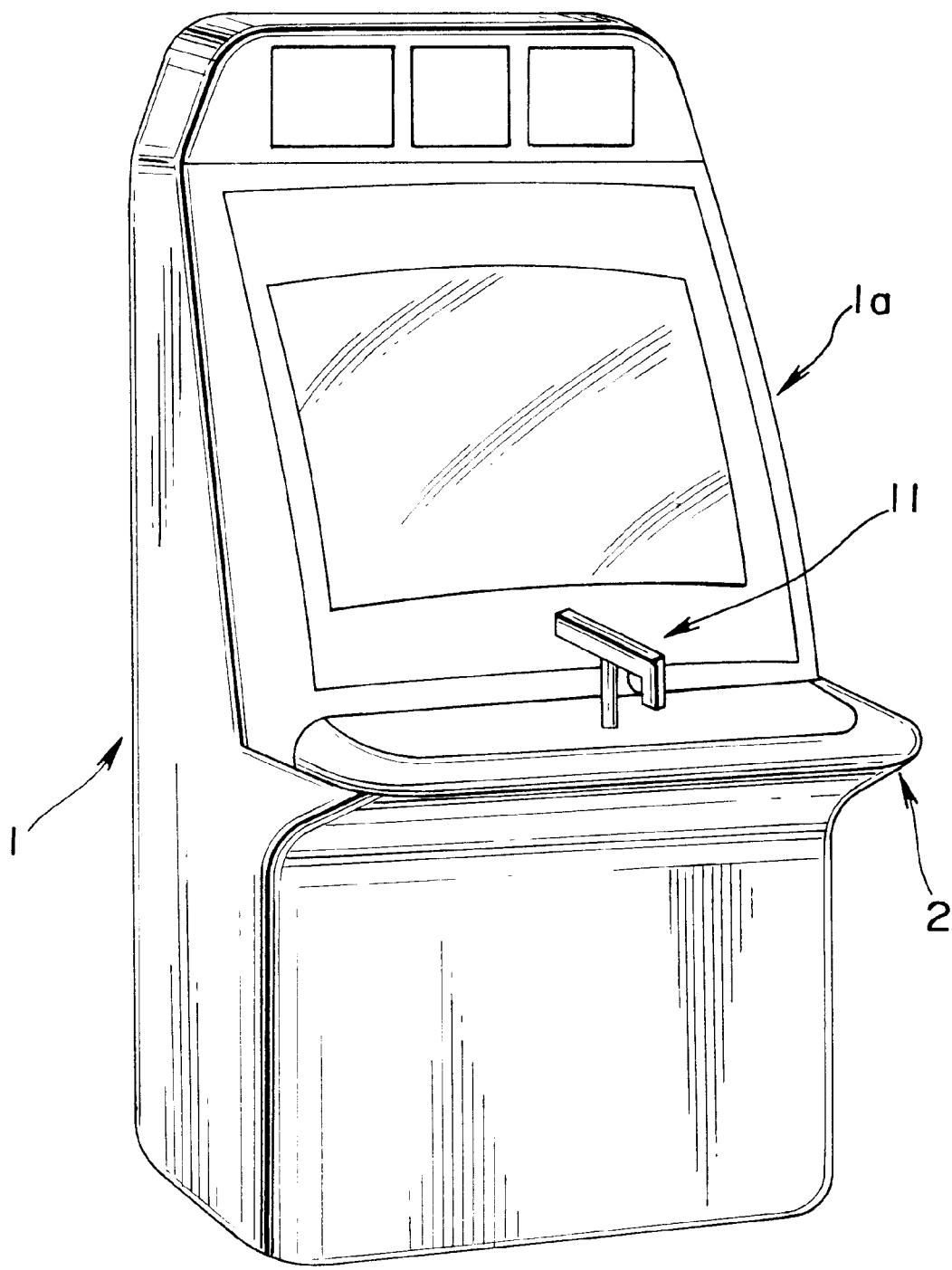
FIG. 1 is a perspective view showing an external view of an image processing device according to the present invention.

FIG. 1 shows an external view of this picture generating device. In this Figure, symbol 1 indicates the main body of a game machine. This game machine main body 1 has the shape of a box and is provided at its front face with a display 1a. A speaker mounting aperture (not shown) is provided laterally of display 1a, and a speaker 14 is arranged within this aperture.

An operating panel 2 is provided on the front face below display 1a, and a gun unit 11 is arranged on this operating panel 2. Gun unit 11 is equipped with a trigger and this gun unit 11 is operated by a player.

A game processing board is provided within game machine main body 1. Display 1a, gun unit 11 of operating panel 2, and the speaker are connected to the game processing board 10. By this means, a player is able to enjoy a gun-shooting game using display 1a and gun unit 11 of operating panel 2.

Figure 2:
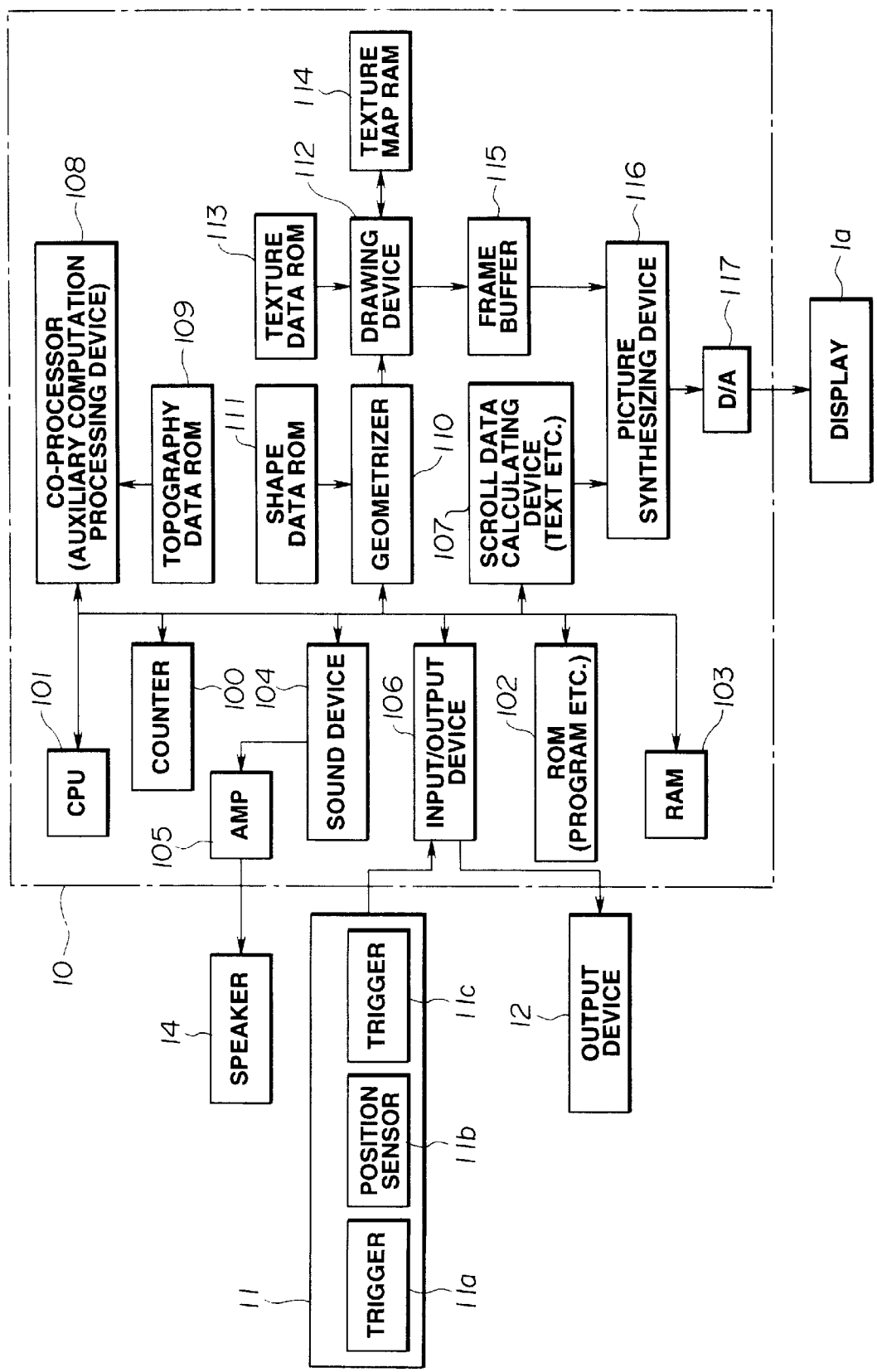
FIG. 2 is a block diagram of a signal processing system for this device.

FIG. 2 is a block diagram of a game processing device according to this embodiment. In outline, this game device comprises display 1a, gun unit 11, game processing board 10, output device 12, and speaker 14.

Game processing board 10 comprises: counter 100, CPU (central processing unit) 101, ROM 102, RAM 103, sound device 104, input/output interface 106, scroll data calculating device 107, co-processor (auxiliary computational processing device) 108, topographic data ROM 109, geometrizer 110, shape data ROM 111, drawing device 112, texture data ROM 113, texture map RAM 114, frame buffer 115, picture synthesizing device 116, and D/A converter 117.

CPU 101 is connected through a bus line to ROM 102 that stores a prescribed program and image processing program etc., RAM 103 that stores data, sound device 104, input/output interface 106, scroll data calculating device 107, co-processor 108, and geometrizer 110. RAM 103 functions as a buffer through which there are performed writing of various commands to the geometrizer (such as object display), and writing necessary data for the various calculations.

Input/output interface 106 is connected to trigger 11a and 11b and position sensor 11c of gun unit 11; by means of this interface, operating signals of trigger 11a and 11b and position sensor 11c of gun unit 11 are input to the CPU 101 as digital quantities. Also, output device 12 is connected to input/output interface 106 and output device 12 is actuated in response to drive control instructions from CPU 101 and operating chamber 2 is moved in response to the content of the game. Sound device 104 is connected to speaker 14 through power amplifier 105; after power amplification, the audio signal generated by sound device 104 is supplied to speaker 14.

In this embodiment, under the control of the program incorporated in ROM 102, CPU 101 reads the operating signal from operating device 11 and graphic data from graphic data ROM 109, or motion data ("enemy characters etc." and three-dimensional data such as "topography, space, and background of various structures etc.") from motion data ROM 111, and performs at least behaviour calculation (simulation) and calculation of special effects.

Behaviour calculation means simulation of the motion of enemies in virtual space. In this process, after co-ordinate values have been determined in three-dimensional space, a conversion matrix for converting these co-ordinate values to the visual-field co-ordinate system, and shape data (polygon data) are specified in geometrizer 110. Graphics data ROM 109 is connected to co-processor 108 so that predetermined graphics data are transferred to co-processor 108 (and CPU 101). Co-processor 108 is provided in order to undertake, chiefly, calculation of floating-point decimals. As a result, various decisions are executed by co-processor 108 and the results of these decisions are transferred to CPU 101: the calculation load on the CPU is thereby lightened.

Geometrizer 110 is connected to motion data ROM 111 and drawing device 112. As already mentioned, shape data consisting of a plurality of polygons (three-dimensional data such as characters, topography and background constituted by the vertices of these polygons) are stored beforehand in motion data ROM 111 and these shape data are transferred to geometrizer 110. Geometrizer 110 transparently converts shape data specified by a conversion matrix sent from CPU 101 and thereby obtains data that have been converted to the visual-field co-ordinate system from the co-ordinate system in three-dimensional virtual space.

Drawing device 112 affixes textures on to the shape data of the visual field co-ordinate system obtained by the conversion and outputs the result to frame buffer 115. In order to perform this affixing of texture, drawing device 112 is connected to texture data ROM 113 and texture map RAM 114 and is also connected to frame buffer 115. "Polygon data" consists of data groups representing the relative or absolute co-ordinates of the vertices of polygons (multi-angle shapes: chiefly triangles or rectangles) consisting of a set of a plurality of vertices.

Graphics data ROM 109 stores the data of polygons that are set up comparatively roughly, sufficiently for a prescribed decision to be executed. In contrast, motion data ROM 111 stores polygon data whereby shapes constituting enemies or a screen of background etc. are set more precisely.

Scroll data calculating device 107 calculates scroll screen data (stored in ROM 102) such as text; such data processed by this calculating device 107 and frame buffer 115 arrive at display 1a through screen synthesizing device 116 and D/A converter 117. The polygon screens (simulation results) of for example enemies and topography (background) that are temporarily stored in frame buffer 115, and the scroll screen of necessary textual information are thereby synthesized with the designated priority to generate the final frame picture data. This picture data is converted to an analog signal by D/A converter 117 and sent to display 1a, so that the game picture is displayed in real time.

Main Processing

Figure 3:
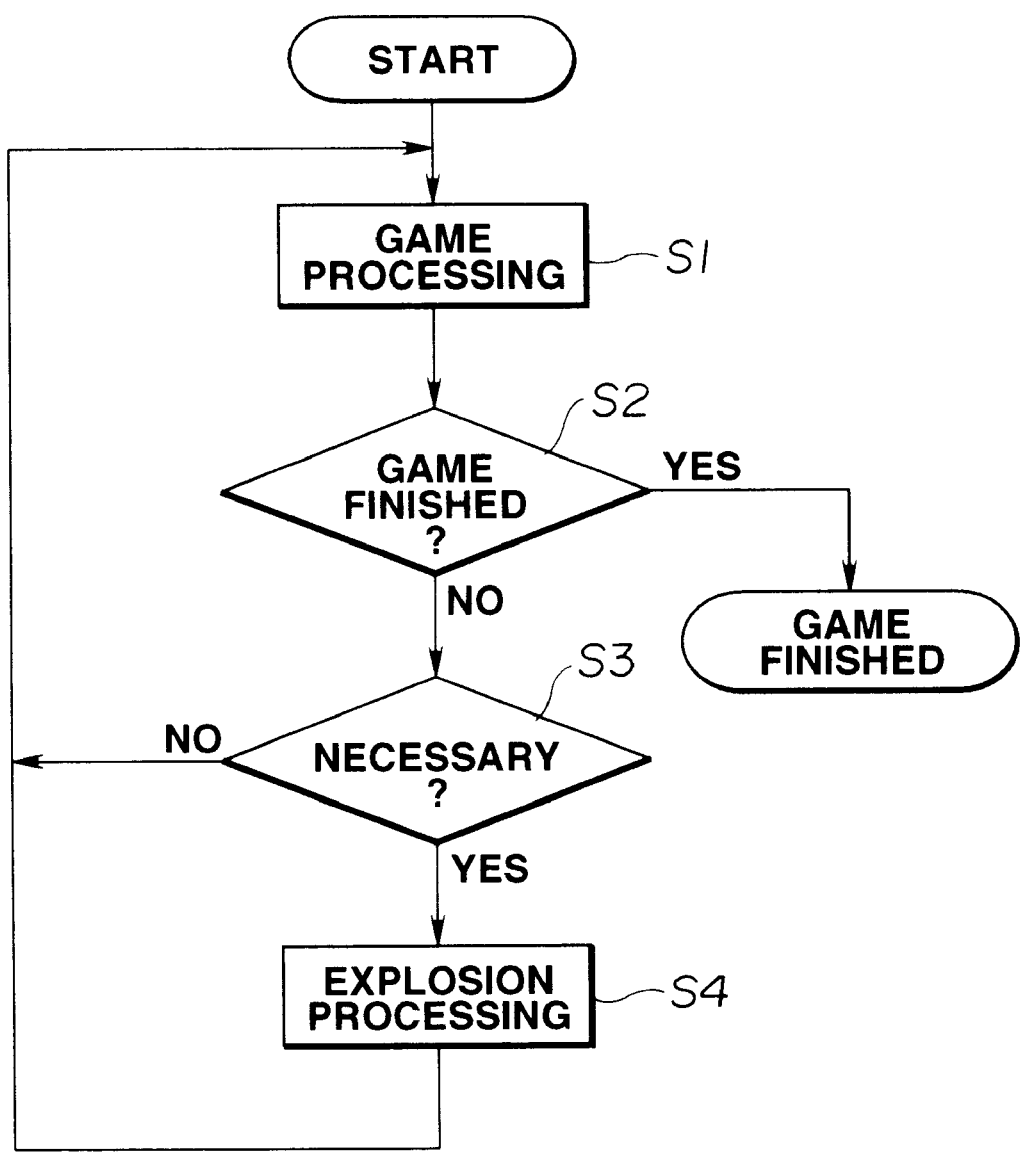
FIG. 3 is a flow chart of the overall processing of this device.

The operation of a game machine according to this embodiment will now be described. FIG. 3 shows the main routine of game processing according to this embodiment. Execution of this main routine is repeated for each frame (1/60 sec). In this main routine, CPU 101 executes the game program stored in ROM 102 (step S1).

Next, a decision is made as to whether game processing has been completed (step S2). If game processing has been completed (step S2: YES), game processing is executed. Also, if game processing has not been completed (step S2: NO), a decision is made as to whether trigger 11a or 11b has been pulled so that explosion image processing should be executed (step S3). If explosion image processing is not being executed (step S3: NO), control returns to game processing. And if explosion image processing is being executed (step S3: YES), control passes to explosion image processing (step S4).

This explosion image processing in step S4 forms: (1) a "mushroom cloud" image; (2) "pillar of fire" ("pillar of water", "pillar of earth") image, (3) (provisional name) "spiky fireball" image or (4) a "smoke" image. These images are selected as follows. For example, when the image viewpoint is changed by operating gun unit 11, a target (enemy) appears, so the player matches up the gun sights on this enemy and pulls trigger i1a or 11b etc. A shell or missile is then fired.

When this shell or missile is fired, the position of arrival of the shell or missile (determined by a collision evaluation between the shell or missile and the background) is specified, using the data of position sensor 11c of trigger angle and direction and the data of trigger 11a or 11b. A "mushroom cloud", "pillar of fire", "water pillar", "pillar of earth", "spiky fireball" or "smoke" image is selected using the information of the background at this position of arrival and the information of trigger 11a or 11b. The selected explosion image is then formed at the position of arrival of the shell/missile.

Mushroom Cloud Image Processing

Next, image processing of a "mushroom cloud" processed in step S4 will be described with reference to FIG. 4 to FIG. 10.

Explanation of Mushroom Cloud Object Data

First of all, the object data of a mushroom cloud will be described with reference to FIG. 4 to FIG. 7. FIG. 4 shows the basic image data of a mushroom cloud. The object data K of a mushroom cloud as shown in FIG. 4B is constituted by stacking up in the Y axis direction in XYZ orthogonal co-ordinates the results of mapping (affixing) a texture to for example prismatic mesh polygons (or semi-transparent polygons) P1 to P9 as shown in FIG. 4A.

Symbol F represents a planar polygon. These prismatic mesh polygons P1 to P9 are respectively constituted by for example octagonal pillar shapes as shown in FIG. 4C. The object data K of this mushroom cloud is constituted by arranging unit image data K1, K2 in exactly the same place.

Figure 5A:
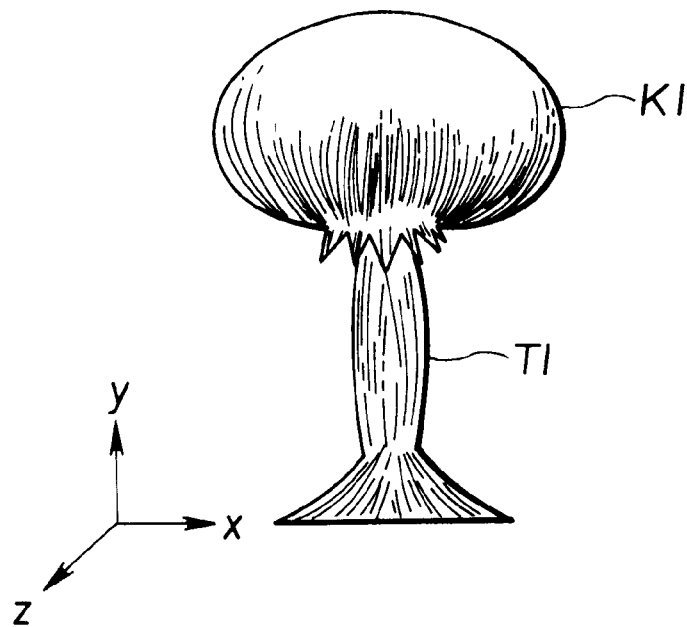
FIGS. 5A and 5B are diagrams of two unit image data items of the mushroom cloud generated by this device.

This unit image data K1, as shown in FIG. 5A, is constituted by mapping texture T1 for three-dimensional representation after stacking mesh polygons P1 to P9. This unit image data K1 can also be represented as shown in FIG. 6A.

Figure 5B:
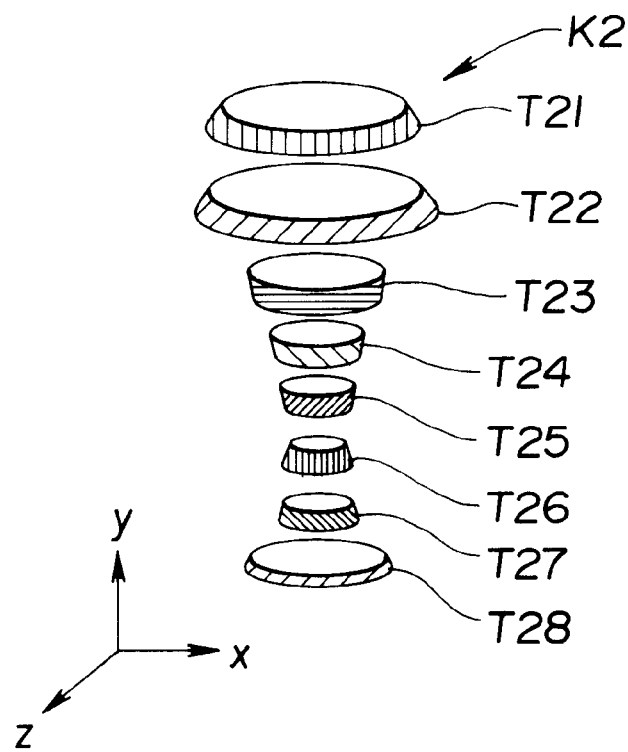

Unit image data K2 is constituted by mapping textures T21 to T28 in slice fashion after stacking mesh polygons P1 to P9 as shown in FIG. 5B. This unit image data K2 can be represented as shown in FIG. 6B.

FIG. 7 shows the expanding portion of unit image data K1, K2 of FIG. 6. FIG. 7A is the expanding portion K1b of unit image data Kl; in this expanding portion K1b, texture T1b appearing in three-dimensional shape is affixed to mesh polygons P1 to P5. FIG. 7B is the expanding portion K2b of unit image data K2. This expanding portion K2b is the result of affixing for example textures T21b, T22b in slice fashion.

In image data Kb obtained by arranging these at the same location in XYZ orthogonal co-ordinates, as shown in FIG. 7C, in places where the texture of expanding portion K2b is not mapped (between textures T21b, T22b etc.), an image solely of expanding portion K1b appears, whereas, in places where textures T21b, T22b of expanding portion K2b are mapped, an image of expanding portions K1b, K2b appears. Thus, by for example rotating textures T21 to T28 of unit image data K2, without losing the three-dimensional effect, an image can be obtained in which flames appear to move: thus a complex image can be obtained.

Image Processing Operation of Mushroom Cloud Object

Figure 8:
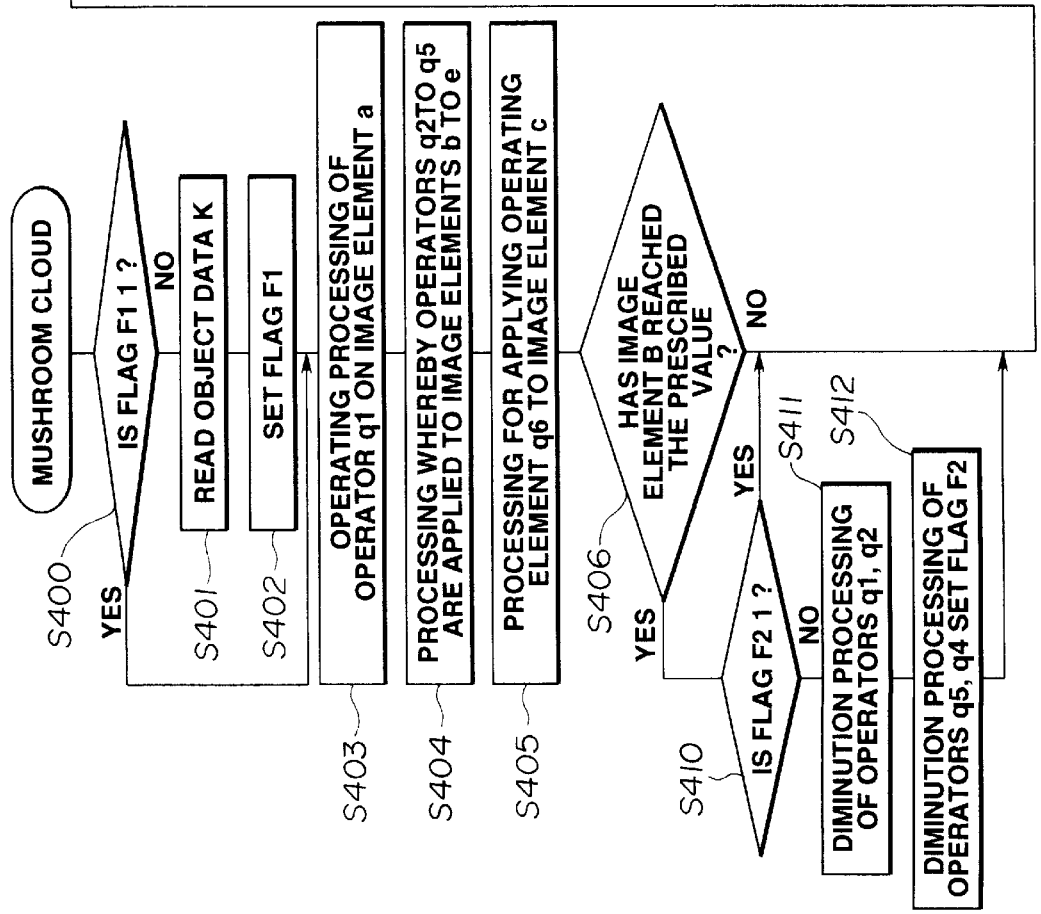
FIG. 8 is a flow chart of the operation of formation of this mushroom cloud object.
Figure 9A:
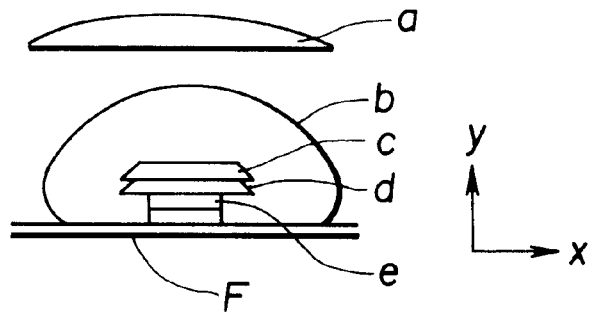
FIG. 9A and 9B are views given in explanation of the changes in this mushroom cloud object.

Next, the image processing operation of an object constituted as above will be described with reference to FIG. 8 to FIG. 10. FIG. 9A is a view of object data K seen from the XY plane. Object data K, as shown in FIG. 9A, consists of object portion (hereinbelow referred to as "image element") a to image element e, and image element F. Image element a consists of an element a1 obtained by mapping a texture for three-dimensional representation to a prismatic mesh polygon, and an element a2 obtained by mapping a slice-shape texture to a prismatic mesh polygon. It should be noted that the height of the prism of image element a is extremely small. The same applies to image element b to image element e.

First of all, when trigger 11b of gun unit 11 for missile firing is pulled, a missile is fired. CPU 101 then finds the location where the missile lands from an evaluation of collision with the background, using for this purpose the relationship of the direction of gun unit 11 and the gun sights. Then, when the missile reaches the point of arrival, first of all, the object data K of the mushroom cloud is fetched from ROM 102, so that an explosion image is displayed at this position (steps S400, S401). Next, flag F1 is set (step S402). The image of the mushroom cloud object is thereby displayed at the position of this point of arrival. As shown in FIG. 9A, this mushroom cloud image is arranged in a condition with the image element a to image element F compressed in the Y axis direction in the XYZ orthogonal co-ordinate system.

CPU 101 then multiplies image element a in FIG. 9A by the prescribed operator q1 (step S403). It also multiplies image element b in FIG. 9B by the prescribed operator q2, image element c by the prescribed operator q3, . . . , and image element e by the prescribed operator q5, respectively (step S404). Also, it multiplies image element F in FIG. 9A by the prescribed operator q6. As a rule, operators q1 to q6 may be assumed to act in the direction such that image element a to image element F are each expanded in the prescribed co-ordinate system every time this routine is executed.

Figure 9B:
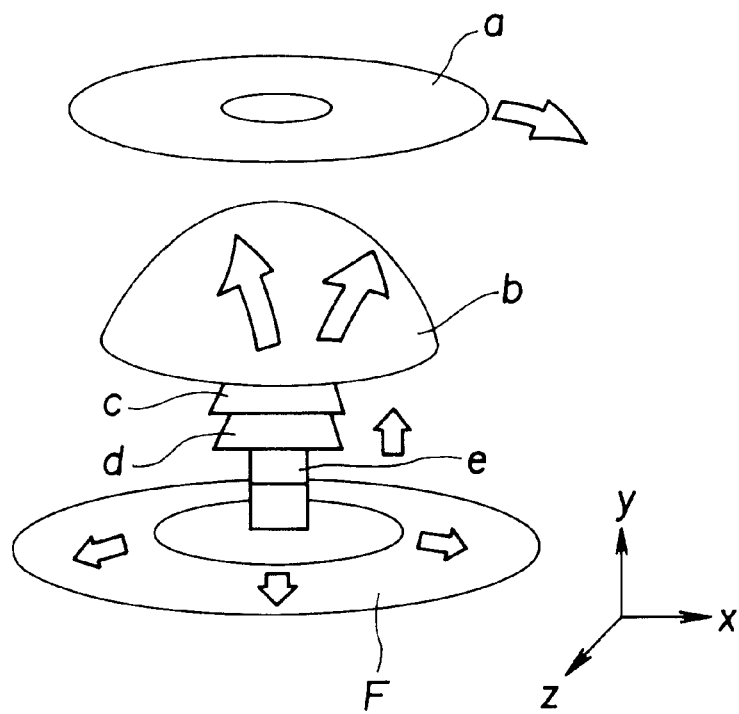

By this means, as shown in FIG. 9B, image element a constitutes image data such that, whilst it rises in the direction of the Y axis, it is displaced in the direction in which the area of the image element a spreads out in the XZ plane, while a hole appears at its centre. Also, image element b constitutes data whereby, whilst rising in the Y axis direction, movement takes place such that the volume of image element b expands in the XYZ orthogonal co-ordinate system. Also, image elements c, d, e constitute data elongating in the Y axis direction.

Next, a decision is made as to whether image element b has reached the prescribed value (step S406). This step serves to execute processing whereby all the various image elements are erased when image element b has reached a prescribed value.

Usually, the prescribed value is not reached immediately (step S406: NO), so, next, a decision is made as to whether the prescribed area of image element e has reached 0 (step S408). This step consists in decision processing such as to effect erasure of the image elements from image element e upwards. Since the prescribed area of image element e will not have become 0 immediately (step S407: NO), this decision is followed by a decision as to whether the prescribed area of image element d has not become 0 (step S408).

This step also constitutes decision processing in order to arrange for the image elements to disappear upwards from image element c. Since this will not of course become zero immediately (step S408: NO), the next step is to decide whether the prescribed area of image element c will not have become zero (step S409). After this, this process is skipped.

Then, when this routine (step S401 to S409) has been executed a prescribed number of times, if image element b has reached the prescribed value (step S406: YES), it is ascertained whether or not flag F2 is set (step S410). CPU 101 is enabled to perform calculation such that the width of image elements a, F is decreased (step S411), by applying operators q1, q6.

Next, CPU 101 applies operators such that the width of image element e in the Y axis direction becomes smaller with a prescribed value and such that image element d decreases with a value smaller than that by which image element e is decreased, by applying operators q5, q4. Flag F2 is also set (step S411). Steps S407 to S409 are then executed.

Figure 10A:
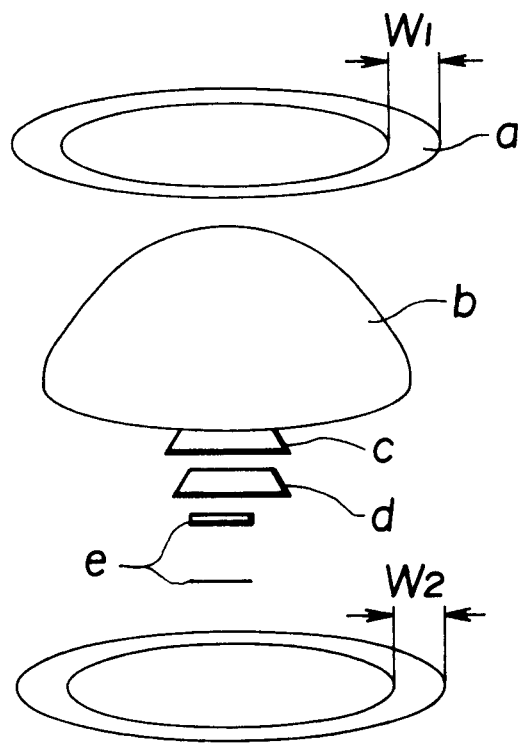
FIGS. 10A and 10B are views given in explanation of the changes in this mushroom cloud object.

Thus, every time this routine (steps S401 to S406, S410, S407 to S409) is executed, in steps S403, S404 and S405, by the action of operators q1, q6, widths w1 and w2 of image elements a, F are reduced as shown in FIG. 10A, and image element e is decreased in the Y axis direction, while image element d is decreased but by less than image element e.

Then, when the prescribed area of image element e has become 0 (step S407: YES), it is ascertained whether flag F3 has been set (step S413). Flag F3 has not been set (step S413: NO), so CPU 101 applies operators such that the width in the Y axis direction of image element d becomes smaller by a prescribed value and image element c decreases with a value that is smaller than the value with which image element e decreases, by operating with operators q4 and q3, and sets flag F3 (step S411).

By this means, the mushroom cloud object is displayed as an image in which image element e has disappeared, while image element d has become smaller. Processing then proceeds through steps S408 and S409.

Thus, every time this routine (steps S401 to S406, S410, S407, S413, S408 and S409) is executed, in steps S403, S404 and S405, by the action of operators q1, q6, width w1, w2 of image elements a, F are decreased as shown in FIG. 10A, and image element d is decreased in the Y axis direction, while image element c is decreased by a value smaller than that of image element d.

Thus, when image element d becomes 0 (step S408: YES), image element d disappears more rapidly, and setting of operator q3 in the direction in which image element c disappears, and setting of flag F4 are performed (steps S415, S416).

Figure 10B:
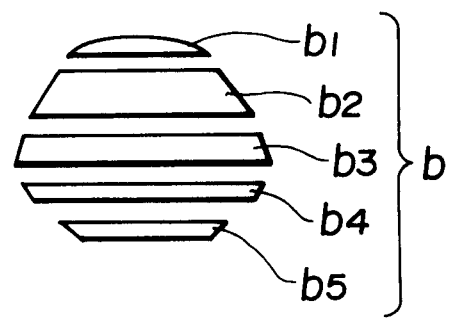

Next, in the condition in which image elements a, c to e and F have been erased (step S409), a process to erase image element b is commenced (step S417). At this step 417, as shown in FIG. 10B, only image element b is being displayed. CPU 101 therefore subdivides image element b into image elements b1 to b5 and performs erasure from image element b5 in sequence to b1 (step S417).

Thus, since the image is changed by applying operators to object data K, a large amount of explosion data, such as was required conventionally, is not needed. Also, a complex image can be obtained since two textures are superimposed.

Pillar of Fire Image Processing

Next, image processing of a "pillar of fire" processed in step S4 will be described with reference to FIG. 11 to FIG. 14.

Explanation of the Pillar of Fire Object Data

Figure 11:
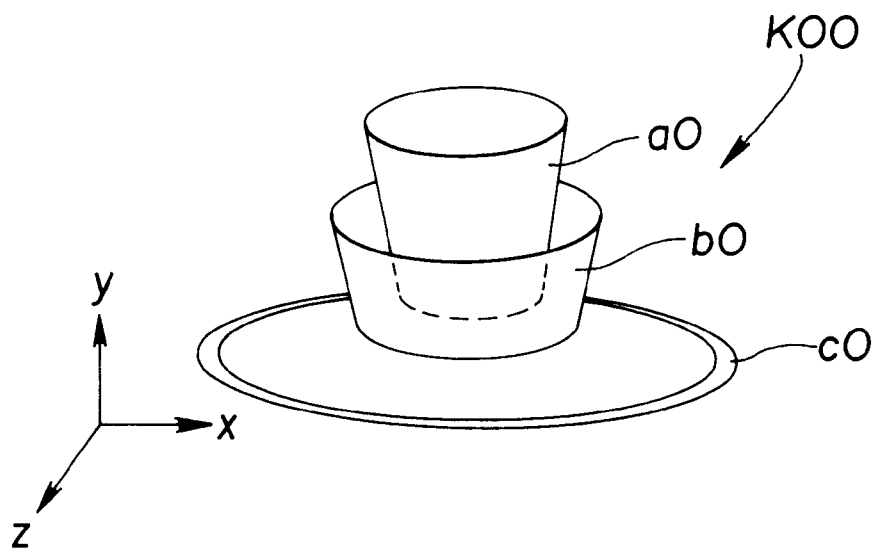
FIG. 11 is a diagram of a pillar of fire object generated by this device.

First of all, the object data of the pillar of fire will be described with reference to FIG. 11 and FIG. 12. In FIG. 11, the object data K00 of the pillar of fire is constituted of image elements a0, b0, c0. Image element a0 consists in for example an octagonal polygon as shown in FIG. 4C arranged in an XYZ orthogonal co-ordinate system and with a cylindrical texture mapped on to it. Likewise, image element b0 consists in for example an octagonal polygon P as shown in FIG. 4C, polygon P, which is larger than image element a, being arranged concentrically with image element a in an XYZ orthogonal co-ordinate system and having mapped on to it a cylindrical texture.

Figure 12A:
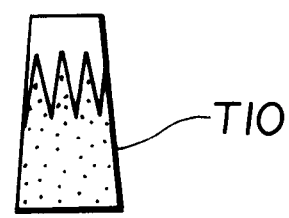
FIG. 12A and 12B are diagrams of texture employed in this pillar of fire.
Figure 12B:
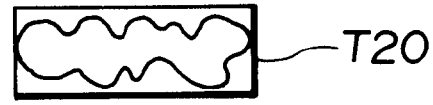

Likewise, image element c0 is for example an octagonal polygon P as shown in FIG. 4C, polygon P, which is larger than image element b, being arranged concentrically with image element a in the XYZ orthogonal co-ordinate system, and having mapped on to it a cylindrical texture. A texture T10 with a spiky top as shown for example in FIG. 12A is mapped on to these image elements a0, b0. Also, a cloud-like texture T20 as shown for example in FIG. 12B is mapped on to image element c0.

Figure 14A:
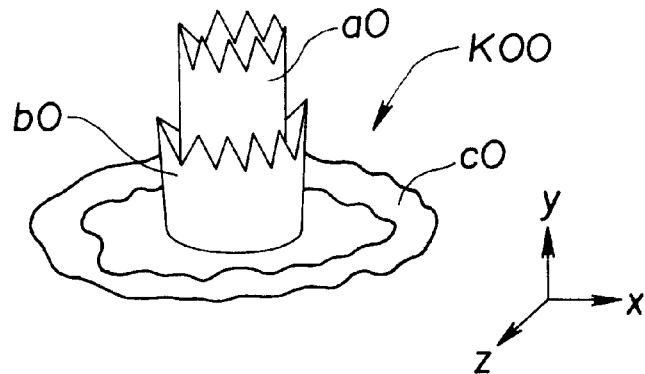
FIGS. 14A–14C are diagrams illustrating the changes of this pillar of fire.

Thus, in fact, the pillar of fire object data K00 will be displayed in a condition as shown in FIG. 14A in which the upper side of image element a0 is indented, the upper side of image element b0 is indented, while image element c0 is displayed as a circular cloud.

Image Processing Operation of the Pillar of Fire Object

Figure 13:
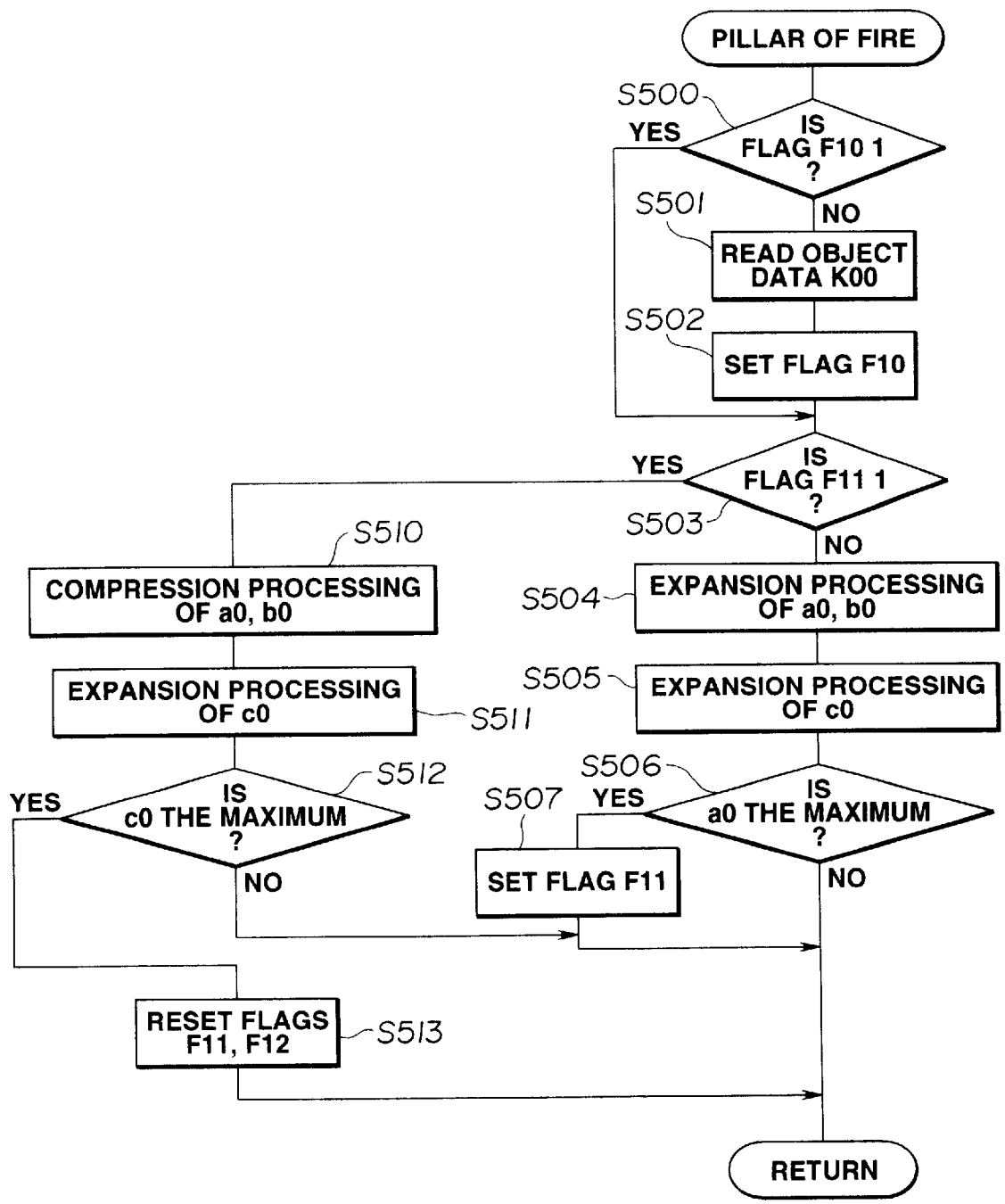
FIG. 13 is a flow chart given in explanation of the operation of formation of this pillar of fire.

Next, the image processing of the pillar of fire object will be described with reference to FIG. 11 to FIG. 14. FIG. 13 is a flow chart of image processing of this pillar of fire object. FIG. 14 is a diagram showing how the appearance of the pillar of fire object changes.

First of all it is ascertained whether or not flag F10 is set (step S500). This is in order to prevent the reading operation being performed again after the pillar of fire object data K00 has been read. If reading of the object data K00 has not been completed (step S501: NO), first of all, the object data K00 of the pillar of fire stored in ROM 102 is read (step S501), and flag F10 is set (step S502). This object data K00 is stored in a prescribed area of RAM 103.

Next, CPU 101 ascertains whether or not flag F11 has been set (step S503). This decision regarding flag F11 is a decision process provided for the purpose of changing over from expansion to contraction. If, at this point, flag F11 has not been set (step S503: NO), CPU 101 executes expansion processing in the Y direction on image elements a0, b0 in RAM 103 (step S504). Likewise, CPU 101 performs expansion processing (step S505) on image element c0 in RAM 103 in the YZ plane direction. Next, CPU 101 ascertains whether for example image element a0 has reached a prescribed value (step S506). The purpose of this step is so that the pillar of fire does not get bigger than a certain amount.

Figure 14B:
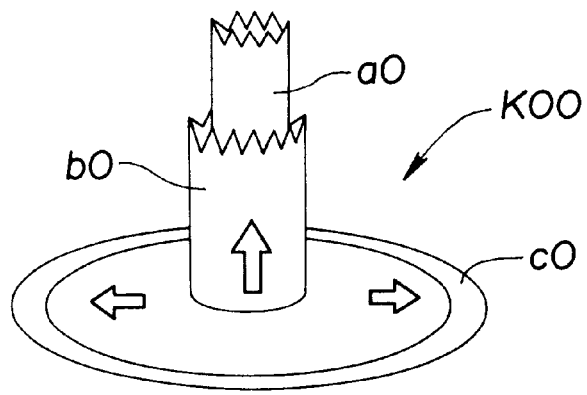

As long as image element a0 has not reached its maximum (step S506: NO), every time this routine (step S500, S503 to S506) is executed, image elements a0, b0 in object data K00 are subjected to expansion processing in the Y direction in the XYZ orthogonal co-ordinate system as shown in FIG. 14B, and image element c0 is subjected to expansion processing in the XZ plane direction.

Next, when image element a0 reaches its maximum (step S506: YES), flag F11 is set (step S507), and return is executed.

After this, since flag F10 is set (step S500: YES) and flag F11 is set (step S503: YES), CPU 101 goes to step S510.

In this step, image elements a0, b0 are subjected to contraction processing in the Y axis direction and expansion processing in the XZ plane direction (step S510). Likewise, CPU 101 further performs expansion processing in the XY plane direction on image element c0, and processing such as to make the thickness w3 of image element c0 approach 0 (step S511).

Figure 14C:
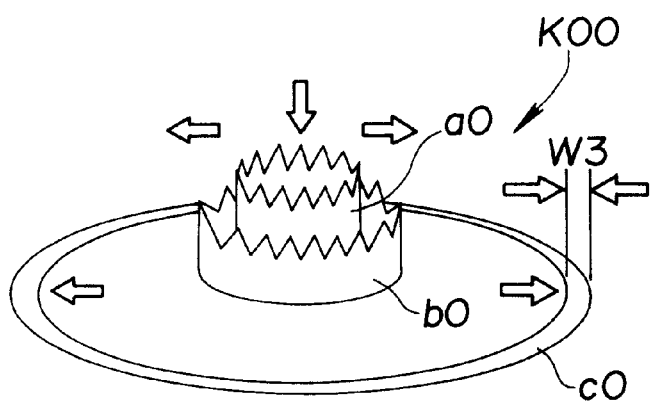

In this way, as shown in FIG. 14C, pillar of fire object data K00 is displayed as an image in which image elements a0, b0 successively shrink in the Y axis direction, and expand in the direction of the XZ plane. Also, image element c0 is displayed as an image in which, as it expands further in the direction of the XZ plane, its thickness w3 is successively diminished.

Next, when image elements a0, b0 have reached their fixed size or more in the XZ plane, and thickness w3 of image element c0 has become 0 (step S511: YES), processing is executed to make flags F10 and F11 0 (step S513). The pillar of fire process is thereby terminated.

Since object data K00 is used in this way to produce an image which is changed by expansion and contraction with time in the XYZ orthogonal co-ordinate system, a large amount of explosion data such as was required conventionally is not needed. A pillar of water and pillar of earth may be produced by altering the textures applied to image elements a0 and b0 to pillar of water texture or pillar of earth texture.

Explanation of the "spiky fireball" Data

First of all, the object data of the "spiky fireball" will be described with reference to FIG. 15. Object data K10 of the "spiky fireball" is constituted by image elements a1, b1 to a8, b8 which are arranged radially in the XYZ orthogonal co-odinate system. Image elements a1, b1 are arranged in the same location and image element a1 is shorter than image element b1. The same applies regarding image elements a2, b2, to a8, b8. This object data K10 is stored in ROM 102.

Figure 15A:
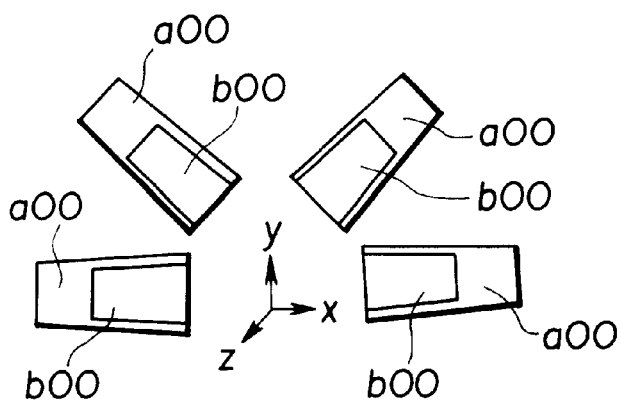
FIGS. 15A–15C are diagrams of object data of a "spiky fireball" produced by this device.
Figure 15B:
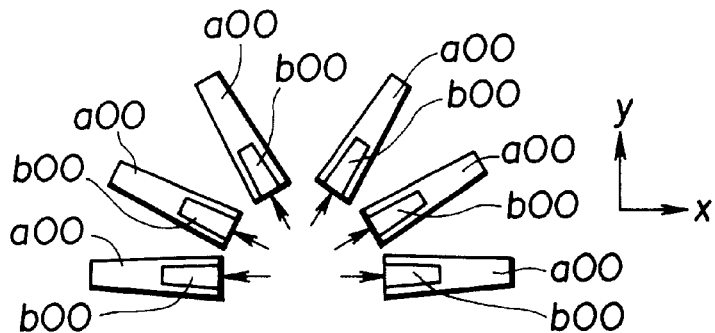
Figure 15C:
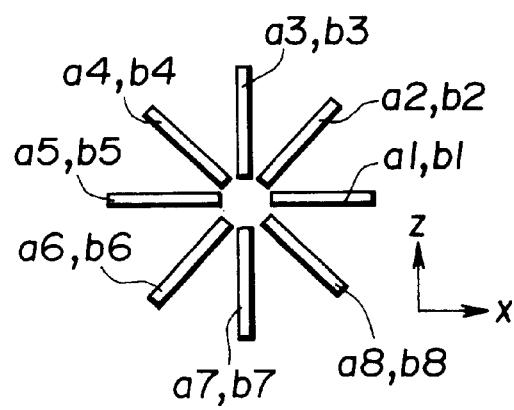

It should be noted that, although in FIG. 15 (a), image elements a1, b1, to a8, b8 are arranged in radial fashion in the XYZ orthogonal co-ordinate system, since it is not possible to state the position of the image elements precisely, they are displayed as totality image elements a00, b00. Also, FIG. 15B represents the condition in which object data K10 is seen from the XY plane, but in this Figure also the image elements are displayed as a00, b00, except that their radial arrangement is shown more clearly. FIG. 15C is a view of object data K10 seen from the XZ plane.

Image Processing Operation of "spiky fireball" Object

Figure 16:
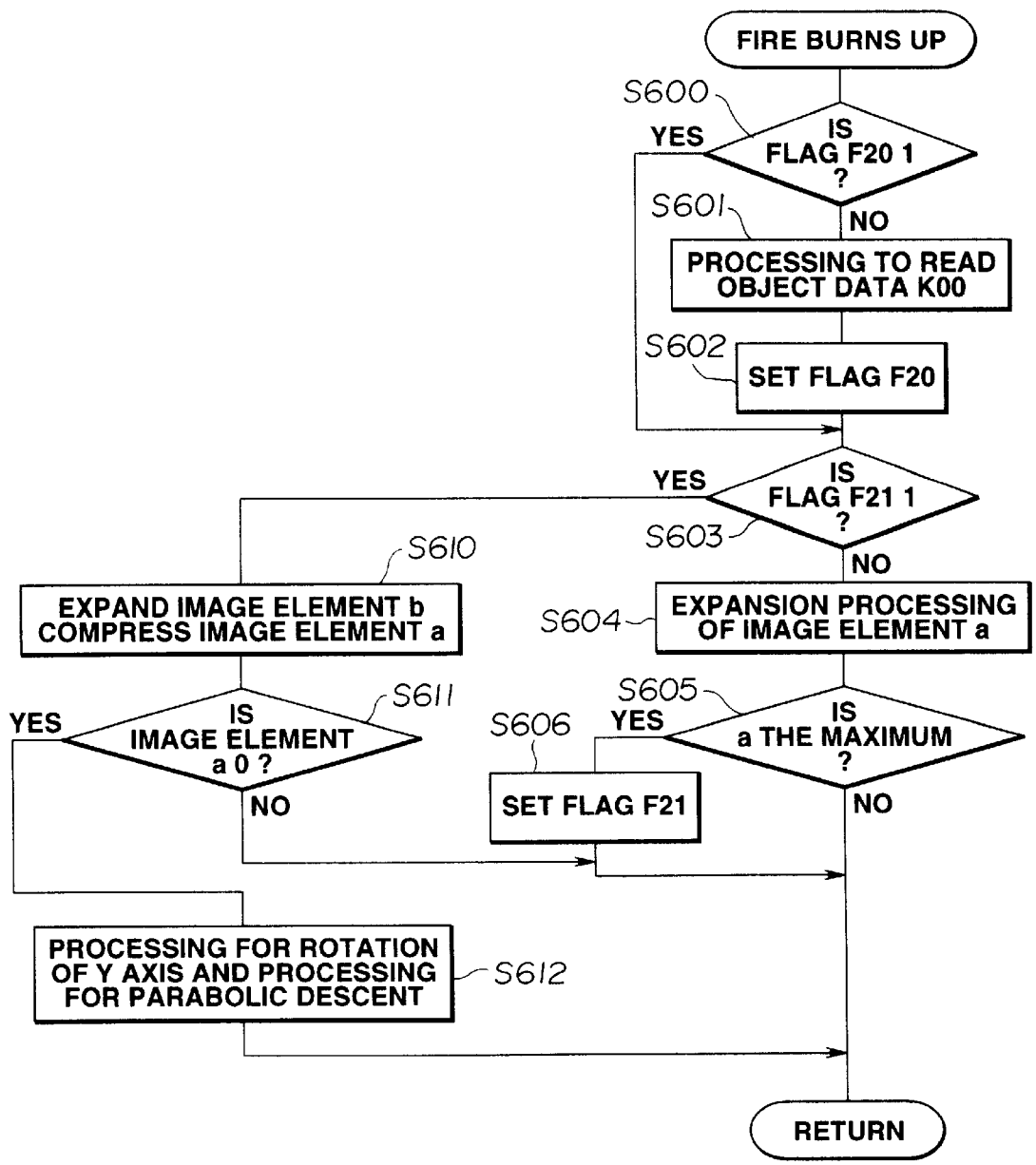
FIG. 16 is a flow chart of the operation of formation of this "spiky fireball"
Figure 17A:
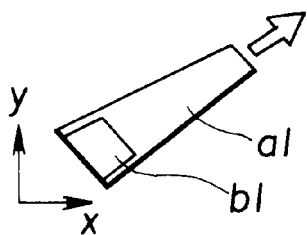
FIGS. 17A–17C are diagrams of the changes of this "spiky fireball"
Figure 17B:
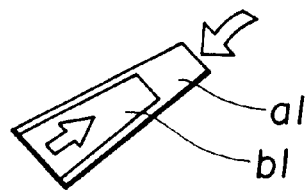
Figure 17C:
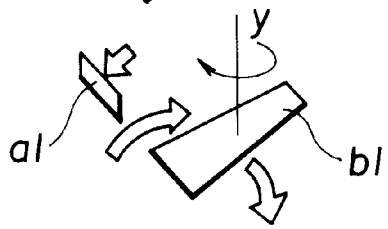
Figure 18:
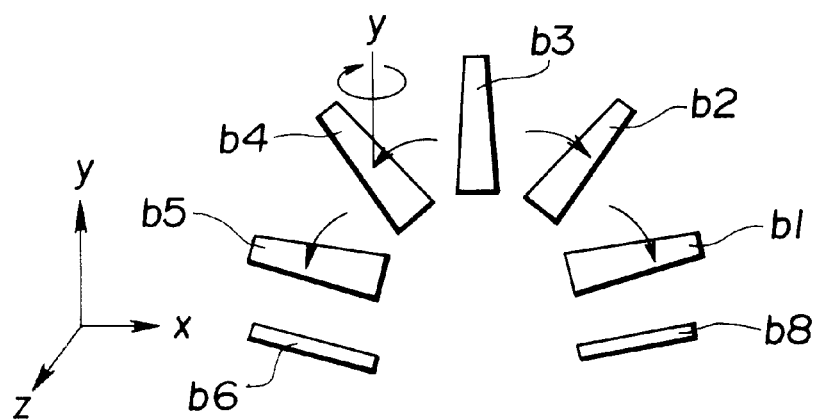
FIG. 18 is a diagram of the changes of this "spiky fireball"

Next, the image processing of the "spiky fireball" object will be described with reference to FIG. 16 to FIG. 17. FIG. 16 is a flow chart of image processing of this "spiky fireball" object. FIG. 17 and FIG. 18 are diagrams showing how this "spiky fireball" object changes.

First of all, it is ascertained whether or not flag F10 has been set (step S600). The purpose of this is to ensure that the operation of reading of the object data K10 of the "spiky fireball" is not repeated after it has been read. If reading of object data K10 has not been completed (step S600: NO), first of all, the object data K10 of the "spiky fireball" stored in ROM 102 is read (step 601), and flag F10 is set (step S602). This object data K10 is stored in a prescribed area of RAM 103. Next, CPU 101 ascertains whether or not flag F21 is set (step S603).

This checking of flag F21 is a decision process to effect changeover from expansion to contraction. Since at this point flag F21 is not set (step S603: NO), CPU 101 executes expansion processing in the radial direction with respect to the XYZ orthogonal co-ordinate system on each of the image elements a1 to a8 in RAM 103 (step S604). Next CPU 101 ascertains whether for example image element a0 has reached its prescribed value (for example its maximum value) (step S505). This step is to prevent image elements a1 to a8 getting larger than a fixed amount.

As long as image element a0 has not reached its maximum (step S605: NO), every time this routine (step S600, S603 to S605) is executed, image elements a1 to a8 in object data K00 are subjected to expansion processing in the radial direction in the XYZ orthogonal co-ordinate system. Also, every time this processing routine is executed, the colour of image elements a1 to a8 is changed from yellow to red. FIG. 17A shows how image element a1 expands (only image element a1 is shown).

Next, when image element a1 has reached its maximum (step S605: YES), flag F21 is set (step S606), and return is commenced.

After this, since flag F20 is set (step S600: YES), and flag F21 is set (step S603: YES), CPU 101 goes to step S610. In this step, processing is performed to shrink image elements a1 to a8 in the radial direction in the XYZ co-ordinate direction, and processing is performed to expand image elements b1 to b8 in radial fashion in the XYZ coordinate direction (step S610).

Also, in this processing step, the colour of image elements b1 to b8 is changed from red to black. A check is then made to establish for example whether the area of image element a1 has become 0 or not (step S611). If it is found that the area of image element a1 has not reached 0 (step S611: NO), return is executed. Thus, every time this routine (step S600, S603, S610, S611) is executed, image elements a1 to a8 shrink and, in substitution for image elements a1 to a8, image elements b1 to b8 expand. FIG. 17B shows this process for image elements a1, b1.

After this, when the area of image element a1 has become 0 (in other words, when image elements a1 to a8 have become 0: step S611: YES), image processing is executed (step S612) such that image elements b1 to b8 descend following a parabola whilst rotating about the Y axis. As a result, as shown in FIG. 17C, image element b1 is displayed in a condition descending on a parabola whilst rotating about the Y axis. At the same time, regarding image elements b1 to b8, as shown in FIG. 18, of the object data K10 of the "spiky fireball", in the XYZ orthogonal co-ordinate system, image elements a1 to a8 expand in the radial direction with passage of time, and, when these image elements a1 to a8 have reached a fixed size, image elements a1 to a8 shrink, while image elements b1 to b8 expand to replace them. These image elements a1 to a8 change from yellow to red with passage of time after being first displayed.

Image elements b1 to b8 also change with passage of time after being first displayed, from red to black. After this, when the area of image elements a1 to a8 has reached 0, image elements b1 to b8 descend along parabolic trajectories whilst rotating about the Y axis.

In this way, the image elements a1 to a8, b1 to b8 of object data K10 are made to expand and shrink, so it is not necessary to have image data that changes in a series, as conventionally; the amount of image data can therefore be reduced and, since two textures can be superimposed, complicated images can be obtained.

Explanation of the Smoke Data

Figure 19A:
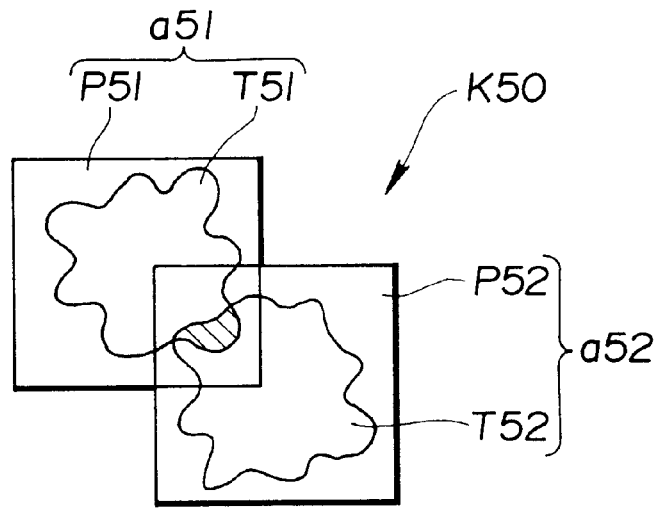
FIGS. 19A and 19B are diagrams of object data of smoke generated by this device.
Figure 19B:
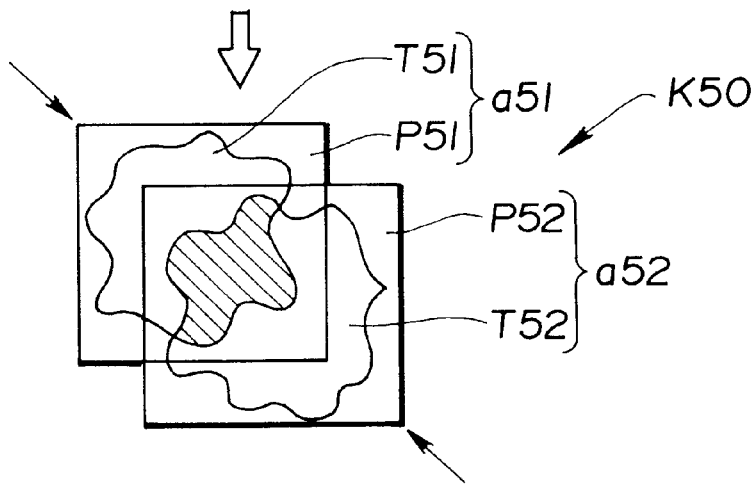

First of all, the object data of smoke will be described with reference to FIG. 19. As shown in FIG. 19A, object data K50 is formed by respectively mapping textures T51 and T52 providing a smoke shape on to planar mesh polygons P51 and P52, with image elements a51, a52 partially overlapping. Of this object data K50, at least image element a52 is then subjected to animation processing. In this way, an image showing a lot of changes can be obtained by performing animation on at least one texture T52, of the smoke object, whose form is made to show a series of changes in the prescribed time.

What is claimed is:

1. An image processing device comprising:
   memory means that stores, for each of a plurality of constituent portions arranged in a radial or in a concentric fashion, object data whose form is anticipated to change in a prescribed time;
   processing means that executes image processing whereby said object is represented by using the data stored in said memory means to respectively constitute a plurality of constituent portions of said object, performing animation in respect of each radial or concentric portion, and combining these portions; and output means that outputs to display means the processing result of this processing means.

2. An image processing device according to claim 1, wherein said memory means also stores texture data for each of said plurality of constituent portions; and said processing means applies texture data of said memory means respectively to the plurality of constituent portions of said object and performs animation in respect of at least one texture.

3. An image processing device according to claim 1, wherein said animation corresponds to at least one type of image processing of: movement, rotation, expansion, contraction, and modification.

4. An image processing device according to claim 1, wherein said object is a representation of an explosion in game software.

5. An image processing device according to claim 4, wherein said explosion representation is at least one of a mushroom cloud, pillar of fire, pillar of water, pillar of earth, spiky fireball and smoke.

6. An image processing device according to claim 4, wherein said explosion representation is a mushroom cloud that is constituted of a plurality of slice-shaped portions arranged in concentric fashion, respective textures being affixed to said plurality of slice-shaped portions.

7. An image processing device according to claim 6, wherein said processing means affects animation whereby said mushroom cloud is displayable in a condition shrunk in the direction of a first coordinate axis, said mushroom cloud is expanded in a prescribed ratio in two or more axial directions including said direction of said first co-ordinate axis, the expansion is repeated until said mushroom cloud has reached a prescribed size, and, when the prescribed size has been reached, said mushroom cloud is shrunk in a prescribed ratio.

8. An image processing device according to claim 4, wherein said explosion representation is at least one of a pillar of fire, a pillar of water, or a pillar of earth constituted of a first pillar-shaped portion, a second pillar-shaped portion, and a planar portion concentrically arranged, and respective textures are affixed to each of these portions.

9. An image processing device according to claim 8, wherein said processing means performs animation whereby said object is displayable in a condition shrunk in a first co-ordinate axis direction, said object is expanded in prescribed ratio in two or more axial directions including said direction of said first co-ordinate axis, expansion is repeated until said object has reached a prescribed size, when the prescribed size has been reached, said object is shrunk in a prescribed ratio in said first co-ordinate axis direction, and is expanded in a prescribed ratio in the other co-ordinate axis directions.

10. An image processing device according to claim 4, wherein said explosion representation is a spiky fireball that is constituted of a plurality of image elements arranged in radial fashion, and said plurality of image elements respectively comprise a first element and a second element.

11. An image processing device according to claim 10, wherein said processing means performs animation whereby said spiky fireball is displayed with said plurality of image elements shrunk in the radial direction, said plurality of image elements are respectively expanded in a prescribed ratio in the radial direction, the expansion is repeated until said spiky fireball has reached a prescribed size, when the prescribed size has been reached, said first element of said plurality of image elements is respectively shrunk in a prescribed ratio in the radial direction, and said second element is respectively expanded in a prescribed ratio in the radial direction.

12. An image processing device according to claim 11, wherein furthermore, when said first element has become smaller than a prescribed size, said processing means erases said second element in accordance with a predetermined procedure.

13. An image processing device according to claim 5, wherein said smoke comprises a plurality of planar polygons to which textures are respectively affixed, at least part of these plurality of polygon textures being arranged so as to mutually overlap.

14. A method of image processing whereby animation is performed on an object, comprising;

a first step wherein an object comprising a plurality of constituent portions and whose form is anticipated to change within a prescribed time is displayable in a compressed condition in a first co-ordinate axis direction;

a second step wherein said object is expanded in a prescribed ratio in at least two axial directions including said first co-ordinate axis direction;

a third step of repeating said second step until said object has reached a prescribed size; and a fourth step of compressing said object in a prescribed ratio when the prescribed size has been reached.

15. A method of image processing wherein animation is performed on an object, comprising:

a first step wherein an object comprising a plurality of constituent portions and whose form is anticipated to change within a prescribed time is displayable in a compressed condition in a first co-ordinate axis direction;

a second step wherein said object is expanded in a prescribed ratio in at least two axial directions including said first co-ordinate axis direction;

a third step wherein said second step is repeated until said object has reached a prescribed size; and a fourth step wherein, when the prescribed size has been reached, said object is compressed in a prescribed ratio in said first co-ordinate axis direction and is expanded in a prescribed ratio in the directions of the other co-ordinate axes.

16. A method of image processing wherein animation is performed on an object, comprising:

a first step wherein an object constituted of a plurality of image elements comprising a first element and a second element arranged in radial fashion and whose form is anticipated to change within a prescribed time is expanded in a prescribed ratio in the radial direction;

a second step wherein said first step is repeated until said object has reached a prescribed size; and a third step wherein, when the prescribed size has been reached, said first element of said plurality of image elements is respectively shrunk in a prescribed ratio in the radial direction, and said second element is respectively expanded in a prescribed ratio in the radial direction.

17. An image processing method according to claim 16, wherein furthermore, when said first element has become smaller than a prescribed size, said second element is erased in accordance with a predetermined representation.

18. An image processing device for displaying, on a display, images of an object having a form anticipated to change in a prescribed time, the image processing device comprising:

memory means that stores image data of a plurality of slice-shaped constituent portions of said object arranged in concentric fashion; and image processing means that generates images of said object with spaces provided between said slice-shaped portions based on the image data stored in said memory means, wherein processing results of said image processing means are outputted for display.

19. An image processing device according to claim 18, wherein said image processing means generates images enabling the inside of said object to be viewed through said spaces.

20. An image processing device according to claim 18, wherein said object is an object representing the image of an explosion.

21. An image processing device according to claim 20, wherein said object is at least one of a mushroom cloud, pillar of fire, pillar of water, pillar of earth, spiky fireball and smoke.

* * * * *